June 13, 1961    G. J. SHELDON    2,987,960
OPTICAL SYSTEM FOR ENDOSCOPES AND THE LIKE
Filed Feb. 17, 1958    2 Sheets-Sheet 1
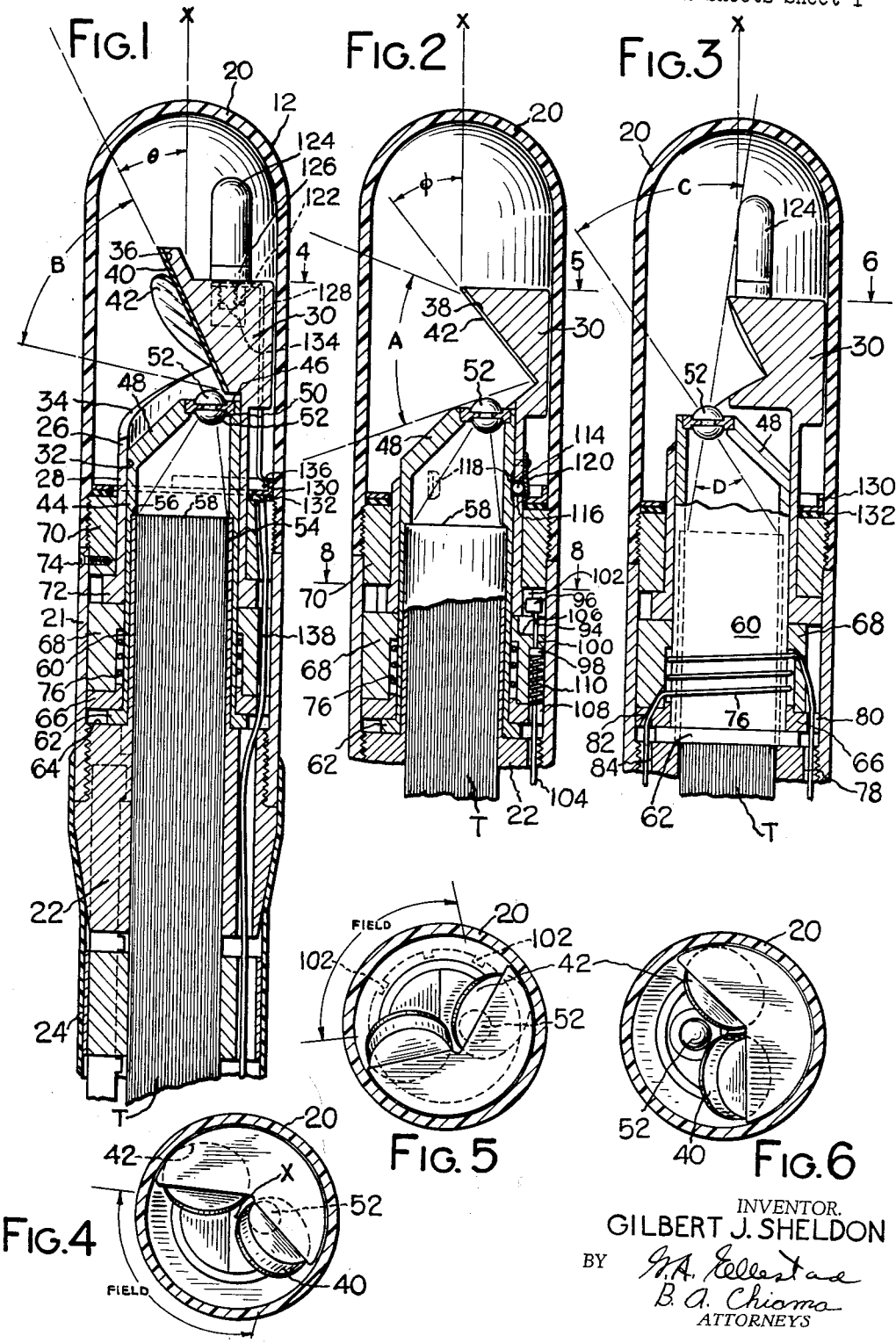
INVENTOR.
GILBERT J. SHELDON
BY
ATTORNEYS June 13, 1961 G. J. SHELDON 2,987,960
OPTICAL SYSTEM FOR ENDOSCOPES AND THE LIKE
Filed Feb. 17, 1958 2 Sheets-Sheet 2
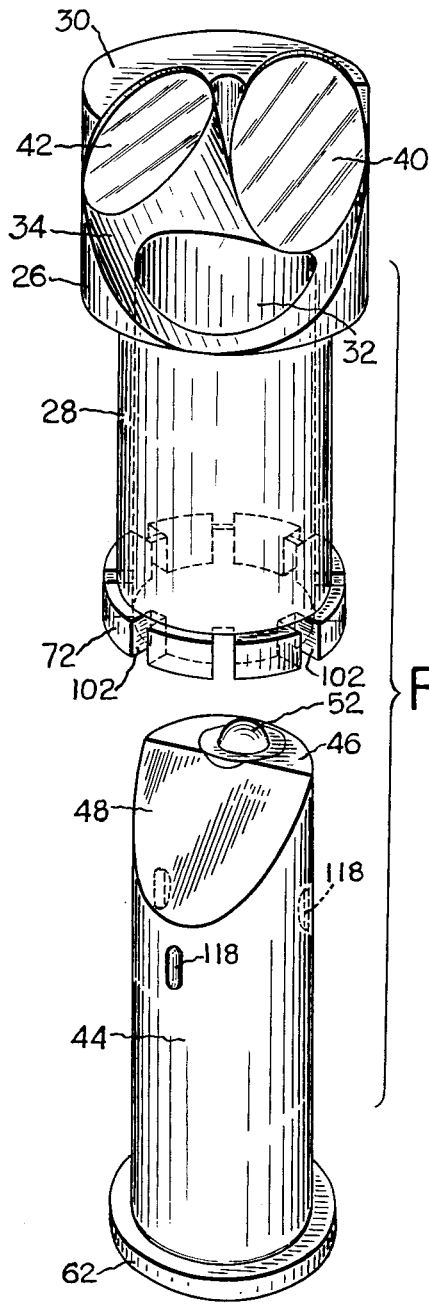
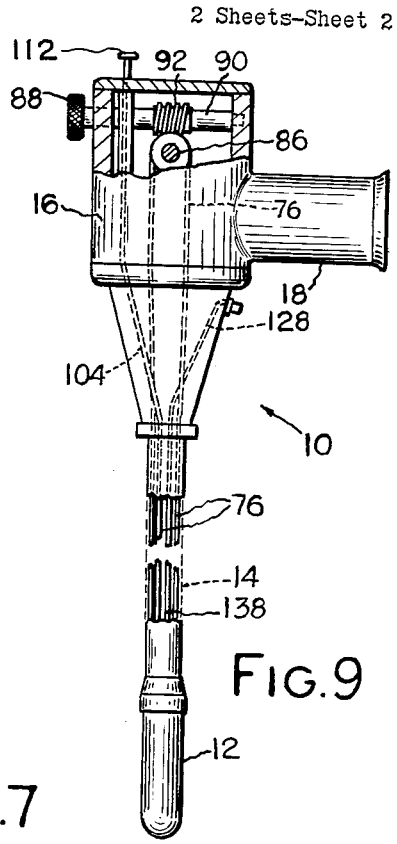
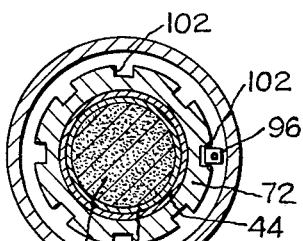
INVENTOR.
GILBERT J. SHELDON
BY
ATTORNEYS United States Patent Office 2,987,960
Patented June 13, 1961

2,987,960
OPTICAL SYSTEM FOR ENDOSCOPES AND THE LIKE
Gilbert J. Sheldon, Irondequoit, N.Y., assignor to Bausch & Lomb Incorporated, a corporation of New York
Filed Feb. 17, 1958, Ser. No. 715,820
6 Claims. (Cl. 88—72)

The present invention relates to optical systems for endoscopic use and, more particularly, to the objective lens system associated with the distal or sighting end of endoscopes.

Generally in devices of this character in order to effect the widest possible image angle, it is customary to employ a reflective surface in conjunction with an objective lens for reflecting the image of the object to be examined upon the objective. The reflective surface may be a mirror or a prism mounted upon a suitable rotatable ring for permitting scanning of the optical system through a field circling the objective. In addition, these devices may incorporate a pivoting action to the mirror or prism in order to position the latter at a different angle with respect to the axis of the objective lens thereby increasing the image angle that may be reflected onto the objective lens.

The disadvantages of this type of system are rather obvious, and principally reside in the inability of the objective to scan a hemispherical field of view. These devices do not permit "straight through" viewing, that is, along the axis of the optic tube which supports the objective. In addition, the reflecting range of the mirror in either position is seriously limited, and in order to accomplish any noteworthy image angle a compromise is usually resorted to whereby the angular relationship between the mirror and the axis of the objective lens is arranged so that the greatest possible image angle for each mirror position is attained. In so doing this, the objective is incapable of sighting below a plane 90° from the axis of the optic tube. If it is desired to adapt the objective means to scan below this plane, an appreciable amount of the image angles of the mirror must be sacrificed to permit such scanning rearwardly. Therefore, it is the principal object of the present invention to provide an improved endoscope objective means which permits a "straight through" as well as a slightly rearward field of vision.

Another object of the invention is to provide an endoscopic instrument with an objective system whose field of view substantially covers a hemisphere.

Another object of the invention is to provide an objective means which is adapted for universal viewing while requiring a minimum of moving parts and optical elements.

Other objects and advantages will become apparent from the following description taken in conjunction with the drawing, wherein:

FIG. 1 is a sectional view of the objective means housing showing the optical elements of the invention arranged for an intermediate image angle range;

FIG. 2 is similar to FIG. 1 but showing the optical elements in another position for an image angle range which includes rearward field of vision;

FIG. 3 is similar to FIGS. 1 and 2 but showing the optical elements in still another position for an image angle range extending along the axis of the objective means housing;

FIG. 4 is a sectional view taken on the line 4—4 of FIG. 1;

FIG. 5 is a sectional view taken on the line 5—5 of FIG. 2;

FIG. 6 is a sectional view taken on the line 6—6 of FIG. 3;

FIG. 7 is an exploded enlarged view, in perspective, of the objective lens holder and the mirror support sleeve related thereto;

FIG. 8 is a sectional view taken on the line 8—8 of FIG. 2 and

FIG. 9 is a plan view of an endoscopic instrument showing the present invention incorporated therein.

Referring now to the drawings and particularly to FIG. 9, there is shown an endoscopic instrument generally indicated by the reference numeral 10 and including a distal end or sighting device 12, a flexible or partly flexible telescope tube 14, a control housing 16 and an eyepiece 18. The endoscope to which the present invention may be adapted may be utilized for various purposes depending upon the body cavity to be examined. The present invention may be utilized in devices other than endoscopes wherein it is desired to observe inaccessible cavities, depressions or the like and, owing to the immobility of the sighting device, universal viewing for one positioning of the sighting device is required. The present invention is especially adaptable for use with a gastroscope since complete and accurate visual examination of the stomach walls has been at most a "dream" to the medical profession and the present invention offers many features which will accomplish full and exact examination of this organ of the human body. While the telescope tube and control means therefor are not a part of the present invention, the present invention is best suited for the endoscopic instrument disclosed and claimed in U.S. patent application Serial No. 686,320, filed September 26, 1957 and assigned to the same assignee as is the present application.

The distal end or sighting device 12 includes a housing 20 wherein are arranged the image forming optical elements of the present invention. The housing 20 is preferably made of transparent material such as plastic or glass and has an open end secured to the adjacent end of an intermediary thimble 21 which in turn is in threaded engagement with the terminal end piece 22 of the telescope tube 14. A suitable covering or casing 24 made of rubber or plastic compound surrounds the tube 14 and slightly overlaps one open end of the thimble 21 in order to provide a smooth and continuous finish to the joining ends of the thimble 21 and the tube and permit use of the structure in moist surroundings without affecting the elements of the structure.

Within the tube 14 and throughout the length thereof, a suitable image transmission system T may be employed, such as a series of lenses or a glass fiber bundle of the type disclosed in the above-referred to patent application. The image transmission system T per se is not part of the present invention but for more efficient transmission, it is preferred that the glass fiber bundle be utilized, as this system, for any appreciable length fo the telescope tube, transmits more light than a multiple lens system.

Mounted within the housing 20 is a mirror image-pickup element 26 having a body portion 28 which is generally cylindrical in shape and a mirror mounting head 30 formed integral at one end thereof. The element 26 is best illustrated in FIG. 7 wherein the same is illustrated in perspective. In FIGS. 1, 2 and 3, various longitudinal cross-sections of the element are illustrated and the respective top or plan views are shown in FIGS. 4, 5 and 6. The element 26 is centrally bored at 32 and, adjacent one end, it is cut away at 34 in order to provide a pair of angled surfaces 36, 38 whereon suitable oval-shaped mirrors 40, 42, respectively, may be attached. The planes of the mirrors are in angular relationship with respect to each other along two axes and both mirrors are in angular relationship with respect to the longitudinal axis of the body portion 28. To illustrate, in FIG. 1, the mirror 40 is at an angle $\theta$ with respect to the optical axis X of the adjacent end of the image transmission system T while in FIG. 2, the mirror 42 is shown at an angle $\phi$ with respect to the same axis with the latter angle somewhat larger. The difference between these angles $\theta$ and $\phi$ is one of the angular relationships between the mirrors 40, 42, referred to above, while the other relationship is derived by rotating, by means hereinafter described, one of the mirrors with respect to the other about an axis parallel to the X axis and best illustrated in FIG. 4. The purpose of this dual angular relationship will be more fully developed hereinafter.

The mirror element 26 is rotatably mounted on a lens holding sleeve or element 44 which itself is in the form of a cylinder having its longitudinal axis in coincidence with the X-axis which is also in coincidence with the axis of the element 26. One end of the sleeve 44 is open while the other end thereof is closed by a wall 46 having its plane normal to the axis of the sleeve and an angled wall 48 which extends from one edge of the wall 46 to the periphery to the sleeve at an angle to the axis thereof. Mounted on the end wall 46 and projecting midway through an aperture 50 formed therein is an objective lens 52 which may be of any suitable wide angle type but the hypergon type is preferred since these lenses have wide angle viewing characteristics which are relatively free of distortion and chromatic aberrations. As shown in FIGS. 1–3, the optical axis of the objective 52 is parallel but offset with respect to the common axes of the housing 20, the X-axis, the mirror element 26 and the lens sleeve or element 44.

The adjacent end of the bundle of fibers T is surrounded by a clamping sleeve 54 which is encircled by the lens sleeve 44. A suitable shoulder 56 formed within the inner periphery of the sleeve 44 serves as an abutment for the upper end of the clamping sleeve 54 and as a means for permanently fixing the image receiving surface 58 of the bundle T with respect to the objective 52. The sleeve 54 is attached to or made integral with the terminal endpiece 22 of the telescope tube thereby being made relatively fixed with respect to the structure contained within the housing 20. As will appear hereinafter, the element 26 and the lens sleeve 44 are adapted to rotate about their axes with the clamping sleeve 54 serving as a bearing for this motion.

As shown in FIG. 1, the cylindrical body 28 of the mirror element 26 surrounds only the upper portion of the lens holding sleeve 44 thus permitting the lower cylindrical portion 60 thereof to extend beyond the open end of the body 28. An annular flange 62 is formed at the open end of the portion 60 and extends radially outwardly therefrom for serving as a retaining seat for the sleeve 44. The flange 62 rests upon an annular shoulder 64 formed in the end section 22 of the telescope tube 14 and thereby locks the sleeve 44 against inwardly axial movement with respect to the transmission system T. Outward axial movement of the sleeve 44 and the mirror element 26 is prevented by a series of retaining rings, namely, ring 66 which loosely seats upon the flange 62, ring 68 which rests upon the ring 66, and a locking ring 70 which loosely retains a flange 72, formed radially outwardly at the open end of the body 28, upon the ring 68. The locking ring 70 is formed with a tapped bore for receiving a set screw 74 held in the open end of the thimble 21, and consequently is held from axial displacement with respect to the telescope tube 14. The housing 20 is in threaded engagement with one end of the locking ring 70 and likewise will be retained upon the thimble.

In order to insure the rotary movement of the lens holding sleeve 44, the annular space between the shoulder 64 and the ring 66 is made slightly larger than the width of the flange 62 and the adjacent surfaces of the shoulder and the ring serve as bearing surfaces for this flange. Similarly, the annular space between the adjacent surfaces of the rings 68 and 70 is made slightly larger than the width of the flange 72 and these serve as bearing surfaces for the rotation of this flange.

Means is provided for rotating the lens holding sleeve 44 and to this end, a flexible cable 76 is threaded through suitable passageways 78, 80 formed in and extending axially through the terminal end section 22 and ring 66, respectively, wrapped two or three times around the end portion 60, and threaded through passageways 82, 84 formed in the ring 66 and the end section diametrically opposite the passageways 78, 80. Anchoring means (not shown) may be utilized for securing the upper loop or turn of the cable upon the outer periphery of the end portion 60 and thereby furnishing a turnstile for the sleeve 44 for causing rotation thereof in either direction depending upon which end of the cable 76 is pulled. In FIG. 9, both ends of the cable 76 are shown as extending through the entire length of the telescope tube 14 and terminating around a pulley 86. A manually actuable knob 88, connecting shaft 90 and a worm gear system 92 serve to impart a pulling force on either end of the cable 76. In practice, a sufficient number of turns of the cable should be utilized in order that the sleeve 44 may be rotated at least 180° in each direction. With this arrangement, the objective 52 will be adapted to describe a complete circle around the axis of the system T. This arrangement also provides a circle driving system for the objective which will be smooth, continuous and easily adaptable for precise location or re-positioning of the objective where the same cannot be physically observed such as when the objective lens system is utilized as a gastroscope or the like.

In order to selectively position the mirror element 26 with respect to the objective 52, a clutch mechanism is provided for selectively connecting the element 26 with the sleeve 44 during rotation of the latter in order to effect controlled rotation of the element. The clutch mechanism, as seen in FIG. 2, comprises a clutch pin 94 having a block 96 at one end and a stop disc 98 at the other end. The pin 94 extends through a passageway 100 formed in the ring 68 and is axially movable in a line generally parallel with the axis X of the system T. As shown in FIG. 2, the block 96 is at its uppermost position of travel and is in mesh with one of a plurality of notches 102 formed in the flange 72 of the mirror element 26.

Lowering of the clutch pin 94 as by a cable 104 secured to the disc 98 and threaded through the end section 22 and the telescope tube 14, will withdraw the block 96 from the notch 102 and carry the same into a recess 106 formed on the locking ring 68. A recess 108 formed in this ring accommodates a coil spring 110 held in compression between one end of the recess and the lower surface of the disc 98 thus serving to normally maintain the block in one of the notches. It will be apparent that in the event the block 96 is in one of the notches, the mirror element is prevented from rotating about its axis, and, conversely, when the block is free of the notch, the element 26 is free to rotate. The cable 104 terminates in a push button 112, see FIG. 9, which may be manually actuated for controlling the positioning of the block 96 with respect to the notch 102. In the simple arrangement shown, the push button 112 may be pulled in order to overcome the bias of the spring 110 for causing removal of the block from the notch 102 and free the element 26 for rotation.

To complete the clutch mechanism, a ball-detent lock means is provided, as shown in FIG. 2, and comprises a ball 114 which is retained in an aperture 116 formed in the wall of the mirror element 26 and which is cooperable with any one of a plurality of elongated recesses or detents 118 formed in the outer periphery of the lens holding sleeve 44. A leaf spring 120 secured to the element 26 covers one end of the aperture 116 and permits limited movement of the ball 114 therein. Normally, the ball will be biased by the spring inwardly or radially against the outer peripheral surface of the sleeve 44 and will roll therealong as the sleeve is rotated with respect to the element 26. When a detent 118 is moved into alignment with the aperture 116, the ball 114 will be forced therein under the bias of the spring thereby locking the sleeve 44 and element 26 together for rotation. Further rotation of the sleeve 44 will cause corresponding rotation of the element 26. In order to disengage the ball 114 from the detent 118 and prevent rotation of the element 26, the clutch block 96 is moved into one of the notches 102 thus momentarily arresting further rotation of the element 26 until the ball 114 is rolled out of the detent 116. Upon this occurrence, the block 96 may be lowered out of locking engagement with the notch 102 and the sleeve 44 will rotate with respect to the element 26 until another detent 118 is encountered.

The objective lens 52 is movable to three sighting positions with respect to mirror element 26, these positions being shown in FIGS. 1, 2 and 3, respectively. In FIG. 1, the objective is in position to receive the reflections of an object to be examined from the mirror 40; in FIG. 2, the objective is in position to receive the reflections from the mirror 42; and in FIG. 3, the objective is in a position in which no rays are received from the mirrors so that the object is viewed directly. The angular spacings of the detents 118 about the periphery of the sleeve 44 are such that for each of these positions of the objective, one of the detents will be in locking engagement with the ball 114. With the clutch pin 94 in its raised position, and the block 96 in a notch 102, rotation of the sleeve 44 about the axis of the system T will move the objective 52 with respect to the mirrors thereby enabling selective viewing arrangements for the objective. When a desired arrangement has been selected with the ball locked in its respective detent, the sleeve 44 and the mirror element may be rotated in unison by a pulling force exerted upon the cable 76. Each of the arrangements shown in FIGS. 1, 2 and 3 illustrates the three locked positions for the mirror element 26 with respect to the sleeve 44. The corresponding plan views of the arrangements are shown in FIGS. 4, 5 and 6, respectively.

In operation, assuming that the clutch block 96 has been moved to its inactive position within the recess 106 and the ball 114 is in one of the detents 118, rotation of the sleeve 44 will impart corresponding rotation to the element 26 for the entire rotative range of the sleeve. If it is desired to change the relative positioning of the element 26 with respect to the sleeve 44, the block 96 is allowed to rise under the bias of the spring 110 and about the lower surface of the flange 72 until a notch 102 has been rotated sufficiently to become aligned with the block for permitting meshing thereof. The number of notches 102 which may be utilized is immaterial, however, it is preferred that at least eight or more be present since the more notches available, the less rotative movement of the element 26 is required in order to effect alignment of a notch with the clutch block. With the element 26 in a non-rotating condition, the sleeve 44 may be rotated further until a desired arrangement, as illustrated in either of FIGS. 1, 2 and 3, is achieved, and once again, the block 96 may be withdrawn from its cooperating notch to allow rotation of the mirror element 26 with the sleeve 44.

The forward tip of the mirror mounting head 30 is internally threaded at 122 wherein it is adapted to receive a lamp 124 for illuminating the area to be viewed by the endoscope. One terminal 126 of the lamp is connected by way of a conductor bar 128 to a circular conductor ring 130 secured to but insulated from, by means of a circular strip of insulation 132, to the locking ring 70. Another terminal 134, generally the threaded mounting shank of the lamp, is electrically grounded when threaded into the element 26. A bent portion 136 of the lower end of the bar 128 serves as a commutator brush and is in continuous engagement with the conductor ring 130 for all positions of the element 26 and during rotation thereof.

An electrical conductor 138 from a suitable source of electric current is threaded through the telescope tube 14 and the various locking rings and is connected to the ring 130 for supplying electrical energy thereto. With the terminal 134 grounded on the mirror element 26, the entire telescope tube 14 may serve as the ground return line for the source of electric current.

The present invention is capable of hyper-hemispherical viewing and in particular is arranged for viewing within a range of 115° from the optical axis X of the system T. This is possible by dividing the full range of 115° into three smaller ranges of image angles wherein three separate optical arrangements are utilized without the necessity of over-extending anyone of the ranges of image angles and therefore eliminate the distortion usually encountered adjacent the edges of wide angle optical viewing.

The first arrangement for a particular range of image angles is shown in FIG. 2 where the objective 52 is in an image receiving position with respect to the mirror 42. FIG. 5 illustrates the plan view of this arrangement. In this arrangement, the mirror 42 is adapted to collect image light rays within an angle denoted as A and it will be noted that the lower extremity of the range drops below the plane which is 90° to the X-axis. In fact, the rearward capabilities of this arrangement may extend up to 25° below the 90° plane to the X-axis.

The second arrangement for a range of image angles is shown in FIG. 1 with the corresponding plan view shown in FIG. 4. In this arrangement, the objective 52 is in an image receiving position with respect to the mirror 40 which is adapted to collect image light rays within an angle denoted as B. The lower extremity range B slightly overlaps the upper extremity of range A and thus eliminates the possibility of "dead spots" within the viewing field between these ranges.

A third arrangement for a range of image angles is shown in FIG. 3 with the corresponding plan view thereof illustrated in FIG. 6. In this arrangement, the objective 52 is free of any reflective image rays from either of the mirrors and is adapted for "straight through" viewing or that range of image angles which is along the axis of the objective. This image range is denoted as C. It will be noted that one of the extremities of the range C extends only a few degrees beyond the X-axis on one side thereof while the other extremity extends an appreciable amount more on the other side. The cause for this phenomena will be described more fully hereinafter. In any event, the lower extremity overlaps the upper extremity of the range B resulting in eliminating any possibility of "dead areas" between these ranges. Since the lens 52 and the mirror element 26 may be rotated in unison, once a desired objective arrangement has been devised, such as either of the positions shown in FIGS. 1, 2 or 3, the objective lens 52 may be rotated to describe a full circle in order to scan an object area or a number of objects which completely circumscribe the optical axis X. With the provision of the above-disclosed arrangement in which the lens 52 may cooperate with each mirror 40, 42, or the arrangement wherein the lens is free to scan individually, the angle of scanning these objects will extend from the azimuth of the objective, which for the present description is the X axis, to a plane up to 115° from this azimuth. Thus, the lens 52 is adapted to focus an image of an object located anywhere in a hemisphere having an axis coincident with the X axis, upon the image plane 58 of the transmission system T.

As shown in FIGS. 1, 2 and 3, the image light rays emanating from the lens 52 and impinging upon the image surface 58 are denoted by the letter character D and it will be noted that these image rays cover the full area of the surface 58 even though the optical axis of the lens is offset from the optical axis X. Actually, the lens 52, being of the wide angle type, is adapted to cover a much larger angle than shown by D, however, since the area 58 is small compared to the image area which could be covered by the lens 52, only those image light rays which actually impinge upon the surface 58 are utilized. As previously mentioned, the one angle extremity of the range C, in FIG. 3, is only a few degrees to the right of the X axis as viewed in that figure, as this will be apparent since the image light rays for an object at a greater angle than this would be lost or would fall on an area which lies out of the boundaries defined by the surface 58. Any greater angle than that shown is unnecessary because when the lens 52 is rotated about the X axis, when utilizing the arrangement shown in FIG. 3, any object lying within the cone defined by the lower extremity of the C range as it rotates, will be focused upon the surface 58.

The image formed upon the surface 58 will be transmitted by the system T to a suitable eyepiece here denoted as 18, where the image may be magnified and/or inverted as desired. In the event a multiple-lens system is utilized instead of a fiber bundle, the image plane for the first lens in the system would replace the surface 58, which, in effect, is the actual purpose for this surface. In either system, the plane, as defined by the surface 58 for the present description would occupy that plane in which an image must be focused in order to be disposed for transmission. In the present description, with the use of a fiber bundle, this plane must be in the plane of the end surface of the fiber bundle in order to condition the system T for transmission of an image.

From the foregoing description, it will be appreciated that the present invention provides an objective system for an endoscopic instrument, or the like, whose field of view covers at least a hemisphere and actually is adapted to scan a hyperhemisphere for any one position of the objective system. This universal scanning is achieved by the use of a simple objective lens element and two mirrors and requires merely a pair of simple control devices to effect scanning. These control devices, namely, the lens rotating cable and turn knob, and the clutch mechanism are composed of simple parts which may be easily fabricated and assembled to the remaining structure. With the use of two rigidly mounted mirrors the possibility of the optical elements of the objective system becoming misaligned is eliminated. More important, the use of concentric sleeves, one to mount an offset objective lens and the other to carry two mirrors, results in a universal scanning system which can be arranged in a housing having the smallest dimensions possible for this type of scanning and with the size of the objective lens and mirrors utilized.

While there is in this application specifically described one form which the invention may assume in practice, it will be understood that this form is shown for purposes of illustration, and that the same may be modified and embodied in various other forms or employed in other uses without departing from the spirit or the scope of the appended claims.

I claim:

1. An endoscope comprising a flexible, elongated light image transmitting portion of relatively small cross sectional dimensions and having a central optical axis, a relatively rigid distal viewing portion secured to said transmitting portion at the front end thereof, said viewing portion including a lens for producing a light image for transmission by said transmitting portion to the rear end thereof, means for supporting said lens in a position offset from said optical axis for rotation thereabout relative to said transmitting portion, and means actuatable from the rear end of said transmitting portion for rotating said lens thereby to scan a field of view without rotating said transmitting portion.

2. An endoscope comprising a flexible, elongated light image transmitting portion of relatively small cross sectional dimensions and having a central optical axis, a relatively rigid distal viewing portion secured to said transmitting portion at the front end thereof, said viewing portion including a lens for producing a light image for transmission by said transmitting portion to the rear end thereof, means for supporting said lens in a position offset from said optical axis for rotation thereabout relative to said transmitting portion, and means actuatable from the rear end of said transmitting portion for rotating said lens thereby to scan a field of view without rotating said transmitting portion, said rotating means including an elongated, flexible tension member strung through said transmitting portion and frictionally engaging said lens supporting means.

3. An endoscope comprising a flexible elongated light image transmitting portion of relatively small cross sectional dimensions and having a central optical axis, a relatively rigid distal viewing portion secured to said transmitting portion at the front end thereof, said viewing portion including a lens for producing a light image for transmission by said transmitting portion to the rear end thereof, means for supporting said lens in a position offset from said optical axis for rotation thereabout relative to said transmitting portion, and means actuatable from the rear end of said transmitting portion for rotating said lens thereby to scan a field of view without rotating said transmitting portion, said lens supporting means including a cylindrically shaped member, and means for mounting said member in coaxial alignment with said transmitting portion and freely rotatable relative thereto, said rotating means including a tension member strung through said transmitting portion and wound around said cylindrical member, and guideway means fixed relative to said transmitting portion for directing said tension member between the circular portion of its path around said cylindrical member and the linear portion of its path through said transmitting portion.

4. An endoscope comprising a flexible, elongated light image transmitting portion of relatively small cross sectional dimensions and having a central optical axis, a relatively rigid distal viewing portion secured to said transmitting portion at the front end thereof, a member rotatable about said central optical axis for supporting an optical objective in said viewing portion with its optical axis generally parallel to and offset from said central optical axis, a reflecting surface positioned in front of said rotatable member and movable relative thereto alternately into and out of the field of view of an optical objective mounted on said rotatable member for bending the viewing axis of the objective, yieldable detent means for releasably fixing said reflective surface relative to said rotatable member for rotation therewith, non-yieldable releasable detent means for fixing said reflective surface relative to said transmitting portion, and means actuatable from the rear end of said transmitting portion for controllably actuating said non-yieldable detent means.

5. A compact optical objective construction for use in endoscopic instruments and the like and for attachment at the front or distal end of the light image transmitting portion thereof comprising a transparent capsule having an open end for rigid attachment to the distal end of the transmitting portion of the instrument in coaxial alignment therewith, a centrally aligned cylindrical lens supporting member within said capsule, means for mounting said member for rotation about the central axis of said capsule, an optical objective mounted at the front end of said rotatable member in offset relationship to said central axis, means for mounting a pair of mirrors in fixed relationship to each other in front of said objective, said mirrors being disposed at different angles with respect to and being offset different distances from said central axis, means for controllably rotating said mirrors about said central axis relative to said rotatable member whereby said mirrors may be selectively positioned one at a time within the field of view of said objective, said mirrors extending across only a relatively small portion of the cross sectional dimension of said capsule and being so arranged that they may both be swung out of the field of view of said objective at the same time.

6. An endoscope comprising a flexible elongated image transmitting portion having a central axis, a relatively rigid distal viewing portion secured at the front end of said transmitting portion, said viewing portion including an optical objective for producing a light image for transmission by said transmitting portion, a first cylindrical member mounted for free rotation about said central optical axis, mounting means for mounting said objective at the front end of said first cylindrical member in a position offset from said central optical axis, a second rotatable cylindrical member fitted around said first member and rotatable relative thereto, a pair of reflecting surfaces fixed on said second member in front of said objective, said reflecting surfaces being inclined at different angles with respect to and offset different distances from said optical axis, a yieldable spring detent engageable between said first and second rotatable members for normally rotating said second member integrally with said first member, releasable non-yieldable detent means for fixing said second member relative to said transmitting portion, a spring for urging said non-yieldable detent means into engagement with said second member, a tension member strung through said transmitting portion for retracting said non-yieldable detent means from engagement with said second member, and a tension member wound around said first rotatable member and strung through said transmitting portion for controllably rotating said first rotatable member from the rear end of said transmitting portion.

References Cited in the file of this patent

UNITED STATES PATENTS

| | | |
|---|---|---|
| 1,199,731 | Ilgner | Sept. 26, 1916 |
| 1,270,876 | Saegmuller et al. | July 2, 1918 |
| 1,431,902 | Wolf | Oct. 10, 1922 |
| 2,002,595 | Wappler | May 28, 1935 |
| 2,405,731 | Beggs et al. | Aug. 13, 1946 |
| 2,877,368 | Sheldon | Mar. 10, 1959 |

FOREIGN PATENTS

| | | |
|---|---|---|
| 274,912 | Great Britain | Jan. 25, 1929 |
| 774,451 | Great Britain | May 8, 1957 |